United States Patent
Thimmappa (10) Patent No.: US 9,021,498 B1
(45) Date of Patent: Apr. 28, 2015

(54) ADJUSTING PAUSE-LOOP EXITING WINDOW VALUES

(71) Applicant: International Business Machines Corporation, Armonk, NY (US)

(72) Inventor: Raghavendra K. Thimmappa, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/098,702

(22) Filed: Dec. 6, 2013

Related U.S. Application Data (63) Continuation of application No. 14/074,174, filed on Nov. 7, 2013.

(51) Int. Cl.
  *G06F 9/46* (2006.01)
  *G06F 9/455* (2006.01)
  *G06F 9/50* (2006.01)

(52) U.S. Cl.
  CPC ............ *G06F 9/4555* (2013.01); *G06F 9/5077* (2013.01)

(58) Field of Classification Search
  CPC ...................................................... G06F 9/52
  USPC ....................................................... 718/104
  See application file for complete search history.

(56) References Cited

U.S. PATENT DOCUMENTS

| | | | |
|---|---|---|---|
| 8,230,203 | B2 | 7/2012 | Neiger et al. |
| 8,347,290 | B2 | 1/2013 | Srinivasan |
| 8,352,944 | B2 | 1/2013 | Weissman et al. |
| 8,423,999 | B2 | 4/2013 | Matsumoto et al. |
| 8,495,628 | B2 | 7/2013 | Ben Yehuda et al. |
| 2009/0077361 | A1* | 3/2009 | Neiger et al. .................. 712/241 |
| 2013/0007323 | A1 | 1/2013 | Arges et al. |

OTHER PUBLICATIONS

Xia et al., Feedback Scheduling: An Event-Driven Paradigm, Dec. 2007, ACM SIGPLAN Notices, vol. 42 No. 12, pp. 7-14.*
Rik van Riel, directed yield for Pause Loop Exiting, Jan. 26, 2011, LWN.net.*
Chen, et al., "Lock-visor: An Efficient Transitory Co-scheduling for MP Guest", 2012 41st International Conference on Parallel Processing, copyright 2012 IEEE, pp. 88-97, <http://ieeexplore.ieee.org/xpl/login.jsp?tp=&arnumber=6337570&url=http%3A%2F%2Fieeexplore.ieee.org%2Fxpls%2Fabs_all.jsp%3Farnumber%3D6337570>.
Dadhania, et al, "Paravirtualization for scalable Kernel-based Virtual Machine (KVM)", copyright 2012 IEEE, <http://ieeexplore.ieee.org/xpl/articleDetails.jsp?arnumber=6354619>.
Theurer, Andrew, "KVM and Big VMs", KVM Forum 2012, IBM Linux Technology Center, <http://www.linux-kvm.org/wiki/images/5/55/2012-forum-Andrew-Theurer-Big-SMP-VMs.pdf>.
Grace Period Disclosure, Raghavendra, KT, "[PATCH RFC 1/1] kvm: Add dynamic ple window feature", Nov. 11, 2012, pp. 1-6, <https://lkml.org/lkml/2012/11/11/14>.
U.S. Appl. No. 14/074,174, entitled "Adjusting Pause-Loop Exiting Window Values" filed Nov. 7, 2013.

* cited by examiner

*Primary Examiner* — Emerson Puente
*Assistant Examiner* — Steven Do
(74) *Attorney, Agent, or Firm* — Nicholas L. Cadmus (57) ABSTRACT

In a method for adjusting a Pause-loop exiting window value, one or more processors execute an exit instruction for a first virtual CPU (vCPU) in a virtualized computer environment based on the first vCPU exceeding a first Pause-loop exiting (PLE) window value. The one or more processors initiate a first directed yield from the first vCPU to a second vCPU in the virtualized computer environment. The one or more processors determine whether the first directed yield was successful. The one or more processors adjust the first PLE window value based on the determination of whether the first directed yield was successful.

2 Claims, 7 Drawing Sheets

```
---
 arch/s390/include/asm/kvm_host.h |  2 ++
 arch/x86/include/asm/kvm_host.h  |  4 ++++
 arch/x86/kvm/svm.c               | 10 ++++++++++
 arch/x86/kvm/vmx.c               | 32 ++++++++++++++++++++++++++++++--
 arch/x86/kvm/x86.c               | 10 ++++++++++
 virt/kvm/kvm_main.c              |  5 +++++
 6 files changed, 61 insertions(+), 2 deletions(-)

diff --git a/arch/s390/include/asm/kvm_host.h b/arch/s390/include/asm/kvm_host.h
index b784154..012b48d 100644
--- a/arch/s390/include/asm/kvm_host.h
+++ b/arch/s390/include/asm/kvm_host.h
@@ -257,4 +257,6 @@ struct kvm_arch{
 };

extern int sie64a(struct kvm_s390_sie_block *, u64 *);
+static inline void kvm_inc_ple_window(void) {}
+static inline void kvm_dec_ple_window(void) {}
 #endif
diff --git a/arch/x86/include/asm/kvm_host.h b/arch/x86/include/asm/kvm_host.h
index b2e11f4..4629e59 100644
--- a/arch/x86/include/asm/kvm_host.h
+++ b/arch/x86/include/asm/kvm_host.h
@@ -707,6 +707,8 @@ struct kvm_x86_ops {
        int (*check_intercept)(struct kvm_vcpu *vcpu,
                               struct x86_instruction_info *info,
                               enum x86_intercept_stage stage);
+       void (*inc_ple_window)(void);
+       void (*dec_ple_window)(void);
 };

struct kvm_arch_async_pf {
@@ -1007,5 +1009,7 @@ int kvm_pmu_set_msr(struct kvm_vcpu *vcpu, u32 msr, u64 data);
 int kvm_pmu_read_pmc(struct kvm_vcpu *vcpu, unsigned pmc, u64 *data);
 void kvm_handle_pmu_event(struct kvm_vcpu *vcpu);
 void kvm_deliver_pmi(struct kvm_vcpu *vcpu);
+void kvm_inc_ple_window(void);
+void kvm_dec_ple_window(void);
```

FIG. 3A

```
#endif /* _ASM_X86_KVM_HOST_H */
diff --git a/arch/x86/kvm/svm.c b/arch/x86/kvm/svm.c
index d017df3..198523e 100644
--- a/arch/x86/kvm/svm.c
+++ b/arch/x86/kvm/svm.c
@@ -4220,6 +4220,14 @@ out:
        return ret;
 }

+static inline void svm_inc_ple_window(void)
+{
+}
+
+static inline void svm_dec_ple_window(void)
+{
+}
+
 static struct kvm_x86_ops svm_x86_ops = {
        .cpu_has_kvm_support = has_svm,
        .disabled_by_bios = is_disabled,
@@ -4310,6 +4318,8 @@ static struct kvm_x86_ops svm_x86_ops = {
        .set_tdp_cr3 = set_tdp_cr3, .check_intercept = svm_check_intercept,
+       .inc_ple_window = svm_inc_ple_window,
+       .dec_ple_window = svm_dec_ple_window,
 };

static int __init svm_init(void)
diff --git a/arch/x86/kvm/vmx.c b/arch/x86/kvm/vmx.c
index ad6b1dd..68fb3e4 100644
--- a/arch/x86/kvm/vmx.c
+++ b/arch/x86/kvm/vmx.c
@@ -115,12 +115,17 @@ module_param(nested, bool, S_IRUGO);
  *         According to test, this time is usually smaller than 128 cycles.
  * ple_window: upper bound on the amount of time a guest is allowed to execute
  *             in a PAUSE loop. Tests indicate that most spinlocks are held for
- *             less than 2^12 cycles
+ *             less than 2^12 cycles. But we keep the default value 2^14 to
+ *             ensure less overhead in uncontended cases.
  * Time is measured based on a counter that runs at the same rate as the TSC,
  * refer SDM volume 3b section 21.6.13 & 22.1.3.
  */
 #define KVM_VMX_DEFAULT_PLE_GAP    128
-#define KVM_VMX_DEFAULT_PLE_WINDOW 4096
+#define KVM_VMX_DEFAULT_PLE_WINDOW 16384
+#define KVM_VMX_MAX_PLE_WINDOW     16384
```

FIG. 3B

```
+#define KVM_VMX_MIN_PLE_WINDOW    4096
+#define KVM_VMX_PLE_WINDOW_DELTA  1024
+
 static int ple_gap = KVM_VMX_DEFAULT_PLE_GAP;
 module_param(ple_gap, int, S_IRUGO);

@@ -7149,6 +7154,27 @@ void load_vmcs12_host_state(struct kvm_vcpu *vcpu, struct vmcs12 *vmcs12)
                vmcs12->host_ia32_perf_global_ctrl);
 }

+#define MAX(a, b) ((a) > (b) ? (a) : (b))
+#define MIN(a, b) ((a) < (b) ? (a) : (b))
+
+static inline void vmx_inc_ple_window(void)
+{
+       if (ple_gap) {
+               ple_window = MIN(KVM_VMX_MAX_PLE_WINDOW,
+                                ple_window + KVM_VMX_PLE_WINDOW_DELTA);
+               vmcs_write32(PLE_WINDOW, ple_window);
+       }
+}
+
+static inline void vmx_dec_ple_window(void)
+{
+       if (ple_gap) {
+               ple_window = MAX(KVM_VMX_MIN_PLE_WINDOW,
+                                ple_window - (KVM_VMX_PLE_WINDOW_DELTA>>2));
+               vmcs_write32(PLE_WINDOW, ple_window);
+       }
+}
+
 /*
  * Emulate an exit from nested guest (L2) to L1, i.e., prepare to run L1
  * and modify vmcs12 to make it see what it would expect to see there if
@@ -7314,6 +7340,8 @@ static struct kvm_x86_ops vmx_x86_ops = {
        .set_tdp_cr3 = vmx_set_cr3, .check_intercept = vmx_check_intercept,
+       .inc_ple_window = vmx_inc_ple_window,
+       .dec_ple_window = vmx_dec_ple_window,
 };

static int __init vmx_init(void)
diff --git a/arch/x86/kvm/x86.c b/arch/x86/kvm/x86.c
index 224a7e7..7af4315 100644
--- a/arch/x86/kvm/x86.c
+++ b/arch/x86/kvm/x86.c
```

```
@@ -6052,6 +6052,16 @@ int kvm_arch_vcpu_setup(struct kvm_vcpu
*vcpu)
        return r;
}

+void kvm_inc_ple_window(void)
+{
+       kvm_x86_ops->inc_ple_window();
+}
+
+void kvm_dec_ple_window(void)
+{
+       kvm_x86_ops->dec_ple_window();
+}
+
 void kvm_arch_vcpu_destroy(struct kvm_vcpu *vcpu)
 {
        int r;
diff --git a/virt/kvm/kvm_main.c b/virt/kvm/kvm_main.c
index 9f390e7..0272863 100644
--- a/virt/kvm/kvm_main.c
+++ b/virt/kvm/kvm_main.c
@@ -1731,15 +1731,20 @@ void kvm_vcpu_on_spin(struct kvm_vcpu *me)
                                yielded = kvm_vcpu_yield_to(vcpu);
                                if (yielded > 0) {
+                                       kvm_dec_ple_window();
                                        kvm->last_boosted_vcpu = i;
                                        break;
                                } else if (yielded < 0) {
                                        try--;
+                                       kvm_inc_ple_window();
                                        if (!try)
                                                break;
                                }
                        }
                }
+       if (!yielded)
+               kvm_inc_ple_window();
+
        kvm_vcpu_set_in_spin_loop(me, false);

/* Ensure vcpu is not eligible during next spinloop */
```

ADJUSTING PAUSE-LOOP EXITING WINDOW VALUES

CROSS REFERENCE TO RELATED APPLICATION

This application is a continuation of U.S. patent application Ser. No. 14/074,174 filed Nov. 7, 2013 the entire content and disclosure of which is incorporated herein by reference.

STATEMENT REGARDING PRIOR DISCLOSURES BY THE INVENTOR OR A JOINT INVENTOR

The following disclosure(s) are submitted under 35 U.S.C. 102(b)(1)(A): DISCLOSURE(S): Web posting titled "[Patch RFC 1/1] kvm: Add dynamic ple window feature", written by Raghavendra K. Thimmappa, made publicly available on Nov. 11, 2012, page(s) 1-6, <https://lkml.org/lkml/2012/11/11/14>.

TECHNICAL FIELD

The present disclosure relates generally to virtual machines, and more specifically to adjusting pause-loop exiting window values.

BACKGROUND

In system virtualization, multiple virtual machines are created within a single physical system. The physical system may be a stand-alone computer, or alternatively, a computing system utilizing clustered computers and components, such as a cloud computing system. Virtual machines are independent operating environments that use logical divisions of physical resources such as processors, memory, and input/output (I/O) systems. A virtual machine hypervisor logically divides the real resources amongst the virtual machines. Virtual machine hypervisors, also called virtual machine managers, use a thin layer of code in software or firmware to achieve resource sharing among the multiple virtual machines. The hypervisor typically virtualizes memory allocation to different virtual machines, and this often enables a greater virtual allocation of memory than real memory. The hypervisor also enables communication between virtual machines on the same physical machine, and to external networks. Typically, a "guest" operating system and one or more applications execute in each virtual machine.

A logical partition hypervisor divides physical system resources into isolated logical partitions ("LPARs"). A logical partition is similar to a virtual machine but typically has an allocation of real memory instead of virtual memory. Each logical partition operates like an independent system running its own operating environment. Exemplary operating environments include AIX®, IBM® i, Linux®, and the virtual I/O server (VIOS). The hypervisor can allocate dedicated processors, I/O adapters, and memory to each logical partition. The hypervisor can also allocate portions of shared processors to each logical partition. Further, the hypervisor can create a shared processor pool from which the hypervisor allocates virtual processors to the logical partitions as needed. In other words, the hypervisor creates virtual processors from physical processors so that logical partitions can share the physical processors while running independent operating environments.

In addition to defining and managing the logical partitions, the hypervisor can manage communication between the logical partitions. To facilitate communication, each logical partition may have a virtual adapter for communication between the logical partitions, via a virtual switch. The type of the virtual adapter depends on the operating environment used by the logical partition. Examples of virtual adapters include virtual Ethernet adapters, virtual Fibre Channel adapters, virtual Small Computer Serial Interface (SCSI) adapters, and virtual serial adapters. Virtual adapters are often implemented through a VIOS partition which manages the physical I/O adapters (SCSI disks, Fibre Channel disks, Ethernet, or CD/DVD optical devices). The other logical partitions may be considered "clients" or virtual I/O clients (VIOCs) to the VIOS.

A Virtual Machine hypervisor or an LPAR hypervisor can dynamically allocate and deallocate dedicated or shared resources (such as processors, I/O, and memory) among virtual machines while the virtual machines are actively in use. This allows the hypervisor to redefine available system resources to improve performance for each virtual machine. Such allocation and deallocation can be referred to as scaling.

Vertical scalability involves assigning to a workload more resources while the workload is running on a physical server or logical partition. Horizontal scalability involves the ability to deploy a workload on additional physical servers or logical partitions. According to current techniques, a hypervisor can vertically scale the resources allocated to a workload according to limits selected by administrative personnel. For example, an administrator can configure the hypervisor to allocate a predetermined number of processors to a virtual machine or LPAR when the existing processors allocated to the virtual machine or LPAR exceed a predetermined level of utilization.

SUMMARY

According to an embodiment of the present invention, a method for adjusting a Pause-loop exiting window value. The method includes one or more processors executing an exit instruction for a first virtual central processing unit (vCPU) in a virtualized computer environment based on the first vCPU exceeding a first Pause-loop exiting (PLE) window value. The method further includes the one or more processors initiating a first directed yield from the first vCPU to a second vCPU in the virtualized computer environment. The method further includes the one or more processors determining whether the first directed yield was successful. The method further includes the one or more processors adjusting the first PLE window value based on the determination of whether the first directed yield was successful.

BRIEF DESCRIPTION OF THE SEVERAL VIEWS OF THE DRAWINGS

FIGS. 3A-3D combined depict an example of patch logic to enable the adjustment of PLE window values, in accordance with one embodiment of the present invention.

DETAILED DESCRIPTION

Pause-loop exiting (PLE) is a hardware feature that detects spin loops in Kernel-based Virtual Machine (KVM) guests and performs Virtual Machine (VM) exits to effectively use a host physical processor. PLE window values determine the number of cycles to wait before a VM exit is performed. Pause-loop exiting may cause unnecessary VM exits in undercommit scenarios. An undercommit scenario occurs when less virtualized processors or memory are allocated than there are physical resources on the system. These unnecessary VM exits are costly in undercommit scenarios because otherwise a VM could continue to spin and get the lock from lockholder.

But with a slight increase in commits, PLE disabling causes serious degradation in performance with respect to the PLE enabled case. There is no solution currently to adapt the PLE window values to changing to an overcommit scenario. An overcommit scenario occurs when more virtualized processors or memory are allocated than there are physical resources on the system. The solution is to dynamically change the PLE window value while a VM is running. One can write the PLE window values to hardware registers to change the PLE window value. But currently there is no implementation available to determine how to adjust the PLE window value algorithmically.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
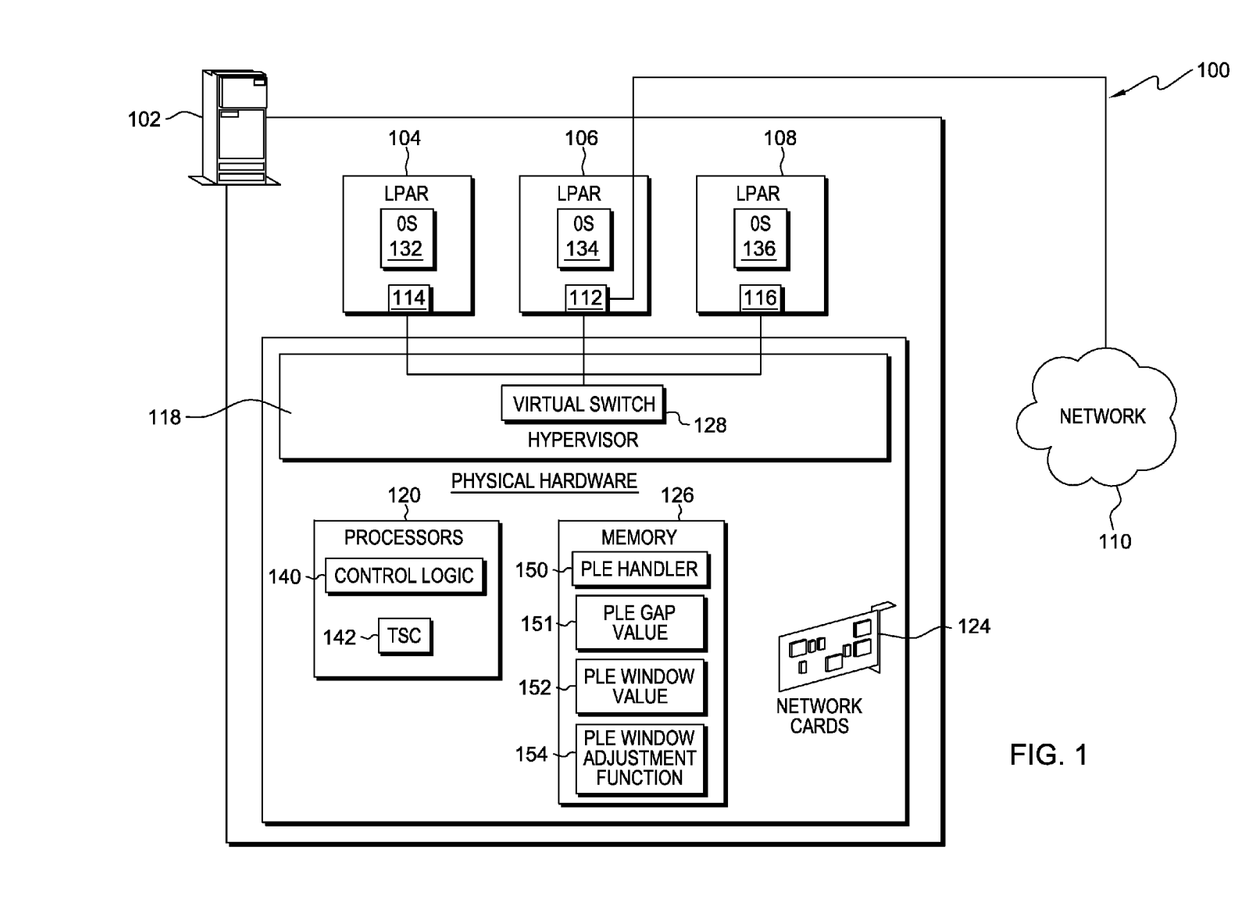
FIG. 1 illustrates a virtualized computer environment in accordance with one embodiment of the present invention.

The present invention will now be described with reference to the figures. FIG. 1 illustrates a virtualized computer environment 100 in accordance with one embodiment of the present invention. Virtualized computer environment 100 includes computer 102. Computer 102 may be any data processing system capable of executing any operating system (OS), Hypervisor, or other software. For example, computer 102 may be a management server, a web server, a desktop computer, laptop computer, tablet computer, or any other computing system. In other embodiments, computer 102 may represent a server computing system utilizing multiple computers as a server system, such as in a cloud computing environment. Computer 102 includes processors 120, network cards/capacity 124, and memory 126.

Processors 120 may be any type of processor, including a general purpose microprocessor, such as a processor in the Intel® Pentium® Processor Family, Itanium® Processor Family, or other processor family from Intel® Corporation, or another processor from another company, or a digital signal processor or microcontroller. Processor 120 may include any number of processors, including any number of multicore processors, each with any number of execution cores, and any number of multithreaded processors, each with any number of threads.

Memory 126 may be static or dynamic random access memory, semiconductor-based read-only or flash memory, magnetic or optical disk memory, any other type of medium readable by processors 120, or any combination of such mediums. Processors 120 and memory 126 may be coupled to or communicate with each other according to any known approach, such as directly or indirectly through one or more buses, point-to-point, or other wired or wireless connections.

Computer 102 has been divided into multiple logical partitions (LPARs) 104, 106, and 108. In the illustrated example, each of the respective logical partitions 104, 106, and 108 runs an independent operating environment, such as an OS. Logical partition 104 runs an OS 132, which can be AIX®, logical partition 106 runs an OS 134, which can be Virtual I/O Server (VIOS), and logical partition 108 runs an OS 136, which can be Linux®. Other operating environments and combinations of operating environments may be used. Each OS of OS 132, OS 134, and OS 136 handles various events such as exceptions (e.g., page faults, and general protection faults), interrupts (e.g., hardware interrupts and software interrupts), and platform events (e.g., initialization and system management interrupts). In another embodiment, any number of partitions may be created and may exist on separate physical computers of a clustered computer system.

Communications from external network 110 may be routed through Shared Ethernet adapter (SEA) 112 on logical partition 106 to virtual adapters 114 and 116 on respective logical partitions 104 and 108. Communications from virtual adapters 114 and 116 on respective logical partitions 104 and 108 may be routed through Shared Ethernet adapter (SEA) 112 on logical partition 106 to external network 110. In an alternative embodiment, physical network adapters may be allocated to logical partitions 104, 106, and 108.

Network 110 may be a local area network (LAN), a wide area network (WAN) such as the Internet, any combination thereof, or any combination of connections and protocols that will support communications between computer 102 and any other device (not shown) in accordance with embodiments of the present invention. Network 110 may include wired, wireless, or fiber optic connections. Virtualized computer environment 100 may include additional computers, client computers, servers, or other devices not shown.

Hypervisor 118 forms logical partitions 104, 106 and 108 from the physical resources of computer 102 through logical sharing of designated processors 120, network cards/capacity 124, and/or memory 126 among logical partitions 104, 106 and 108. Hypervisor 118 performs standard operating system functions and manages communications between logical partitions 104, 106, and 108 via virtual switch 128. Hypervisors, also called virtual machine managers, use a thin layer of code in software or firmware to achieve fine-grained, dynamic resource sharing. Each logical partition expects to access physical resources, such as processor and platform registers, memory, and input/output devices, of computer 102.

At any given time, processors 120 may be executing instructions from hypervisor 118 or any logical partition. Hypervisor 118 or any logical partition may be running on, or in control of, processors 120. When a logical partition attempts to access a resource, control may be transferred from the logical partition to hypervisor 118. The transfer of control from a logical partition to hypervisor 118 is referred to as a "VM exit." After facilitating access to the resource appropriately, hypervisor 118 may return control to a logical partition. The transfer of control from hypervisor 118 to a logical partition is referred to as a "VM entry."

Processors 120 include time stamp counter (TSC) 142 to count processor clock cycles, or otherwise measure the passage of time. In other embodiments, other approaches to measure the passage of time may be used. Additionally, processors 120 include control logic 140 to support virtualization. Control logic 140 may include microcode, programmable logic, hard-coded logic, or any other form of control logic within processors 120. In other embodiments, control logic 140 may be implemented in any form of hardware, software, or firmware, such as a processor abstraction layer, within a processor or within any component, accessible or medium readable by a processor, such as memory 126.

Control logic 140 includes logic to prepare for and perform VM entries and exits. Control logic 140 also includes logic to detect the execution of spin loops. Control logic 140 may also perform additional functions.

Control logic 140 may refer to data structures, such as fields, indicators, bits, or other data structures within memory 126 or platform registers, to determine how to manage a VM environment. In one embodiment, a virtual machine control structure (VMCS) may be utilized. A VMCS is a structure that may contain state of a logical partition or multiple logical partitions, state of hypervisor 118, execution control information indicating how hypervisor 118 is to control operation of a logical partition or multiple logical partitions, information regarding VM exits and VM entries, and any other information. In one embodiment, data structures may be stored in memory 126.

In one embodiment, the data structures include a pause-loop exiting (PLE) control structure that may be set to cause a VM exit if control logic 140 detects a spin loop being executed by a logical partition. For example, the PLE control structure may be a control bit. The data structures also include PLE gap value 151 and PLE window value 152. PLE gap value 151 may be used to store a value that represents a number of cycles within which one iteration of a spin loop would typically be executed. PLE window value 152 may be used to store a value that represents a number of cycles that a logical partition is to be allowed to execute a spin loop before a VM exit occurs.

Computer 102 also includes PLE handler 150. In one embodiment, PLE handler 150 is part of the operating system (not shown) of computer 102. In another embodiment, PLE handler 150 is part of hypervisor 118. PLE hander 150 generally handles virtual CPU scheduling in response to a VM exit. PLE handler 150 operates to determine the best virtual CPU of a logical partition to yield the physical resources of processors 120 to and performs a directed yield to that virtual CPU of a logical partition, in response to a VM exit. PLE handler 150 may be implemented in any form of hardware, software, or firmware, such as a processor abstraction layer, within a processor or within any component, accessible or medium readable by a processor, such as memory 126.

In one embodiment, PLE handler 150 includes PLE window adjustment function 154. In other embodiments, PLE window adjustment function 154 may be implemented as a separate function from PLE handler 150 in any form of hardware, software, or firmware, such as a processor abstraction layer, within a processor or within any component, accessible or medium readable by a processor, such as memory 126.

PLE window adjustment function 154 operates to adjust PLE window value 152 depending on the success or failure of a virtual CPU of a logical partition performing a directed yield to a virtual CPU of another logical partition.

The algorithm for adjusting PLE window value 152 is incorporated into PLE handler 150 so that in undercommit scenarios we have a fairly high value for PLE window value 152 so that frequent and unnecessary VM exits do not occur. For overcommit scenarios PLE window value 152 is lowered so that lock holder preemption is quickly identified and a VM exit is performed. The VM exit results in yielding processor time to a better virtual CPU. The potential undercommit or overcommit scenarios are determined by the success of directed yield in PLE handler 150.

Example parameters are as follows: ple_window_min is the ideal value of PLE window value 152 for overcommit scenarios; ple_window_max is the ideal value of PLE window value 152 for undercommit scenarios; and ple_window_delta is the variable that controls the change of PLE window value 152.

An asymmetric algorithm is used for adjusting PLE window value 152. The amount of change in PLE window value 152 during incrementing is greater but amount of change while decrementing PLE window value 152 is lesser. This asymmetric nature is needed because the rate of successful directed yields to a virtual CPU is higher compared to failed directed yields.

For example, if a virtual CPU is able to successfully yield to another virtual CPU, PLE window value 152 is decremented by a function of PLE_window_delta (e.g., ⅛*PLE_window_delta).

In another example, if a virtual CPU could not yield to another specifically determined virtual CPU in a potential undercommit scenario, PLE window value 152 is incremented by a function of PLE_window_delta (e.g., 1*PLE_window_delta). Potential undercommit scenarios occur when we observe a run queue length of one for both source and target virtual CPUs during a directed yield operation.

In yet another example, if a virtual CPU could not yield to any virtual CPU, PLE window value 152 is incremented by a function of PLE_window_delta (e.g., 1*PLE_window_delta).

Figure 2:
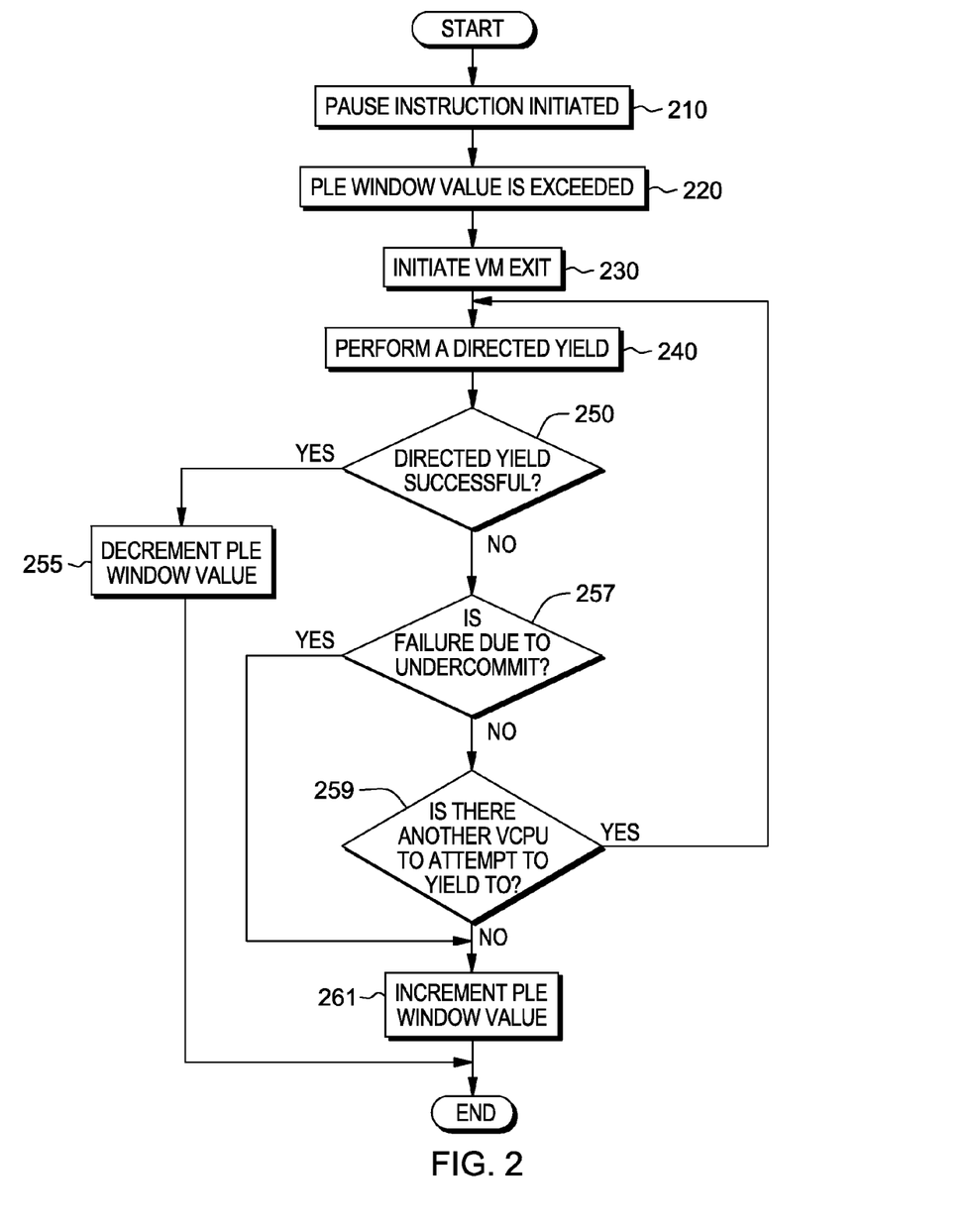
FIG. 2 is a flowchart of a method for adjusting Pause-loop exiting (PLE) window values, in accordance with one embodiment of the present invention.
Figure 3A:
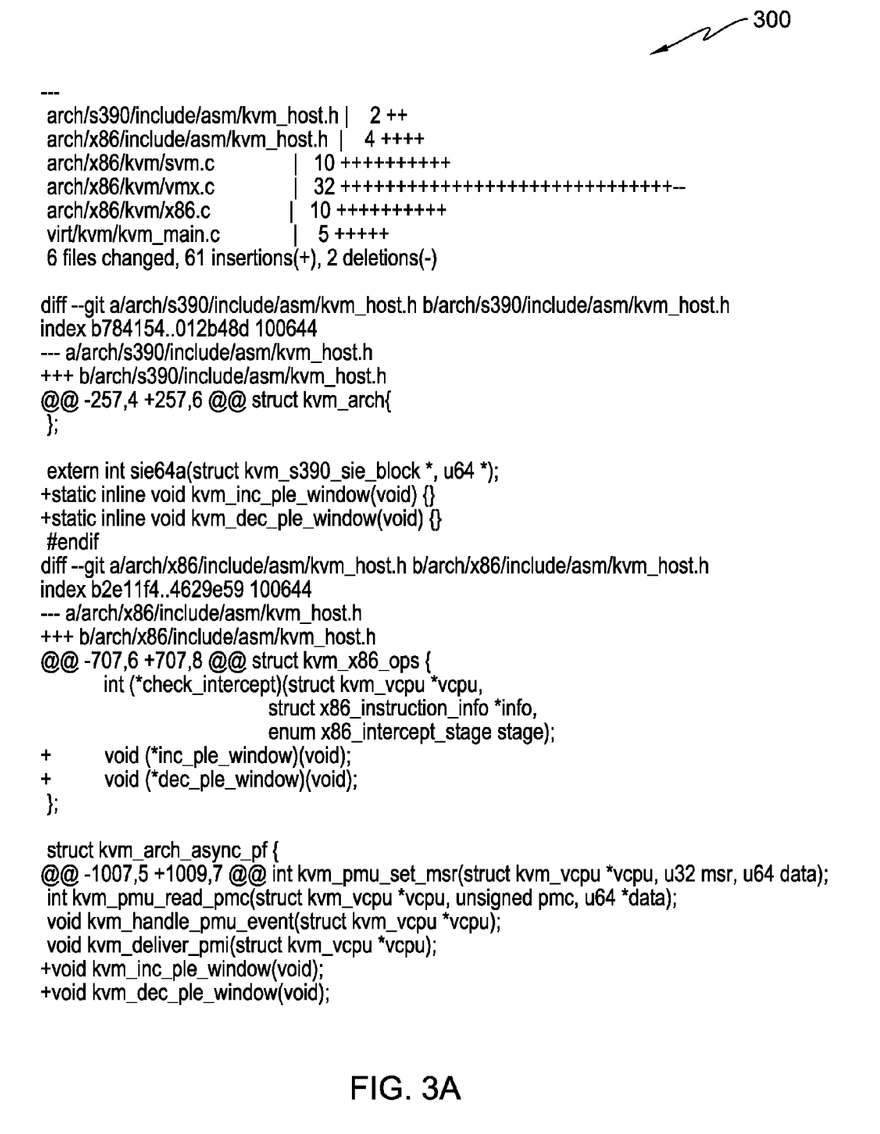
Figure 3C:
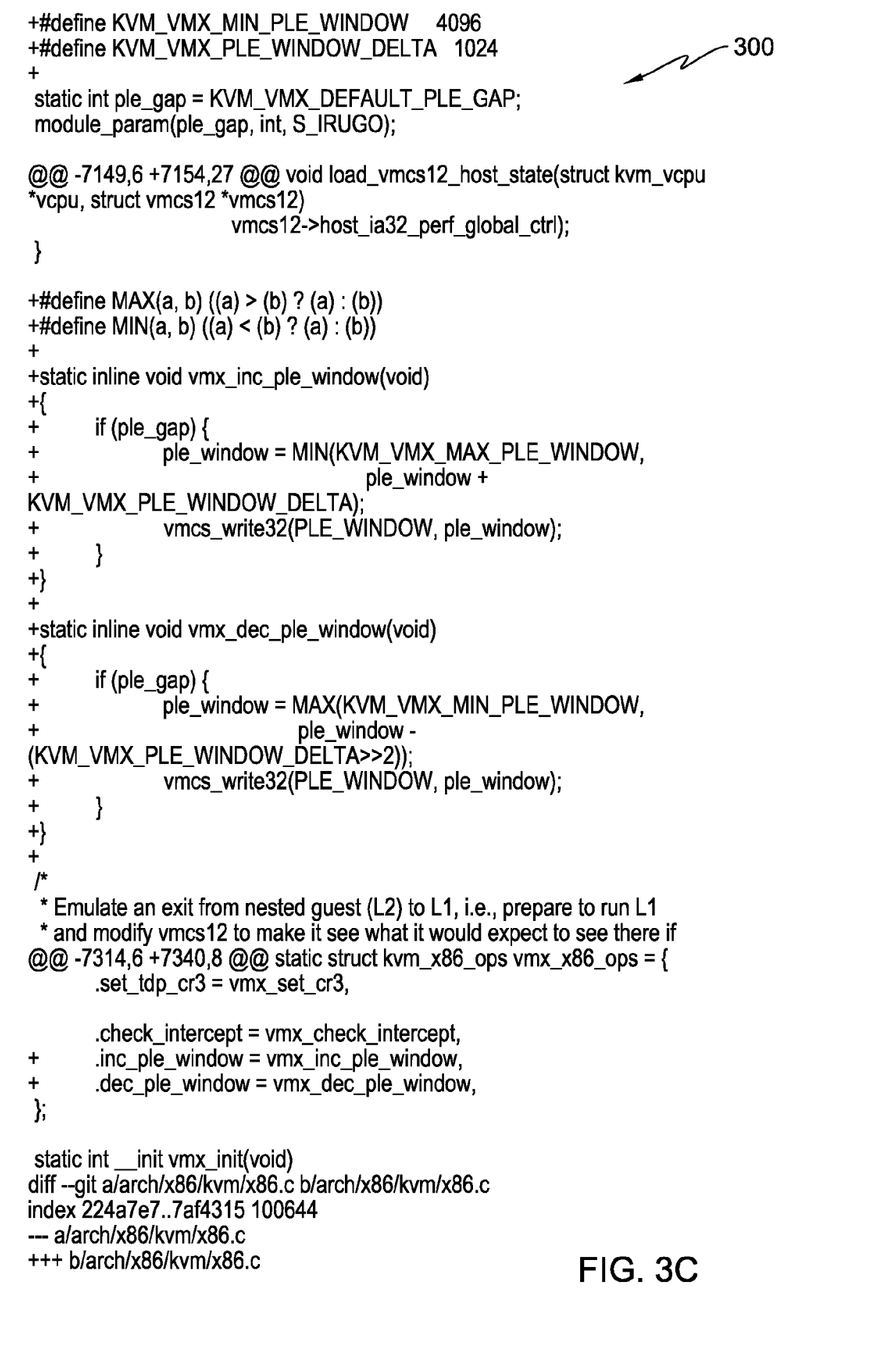
Figure 3D:
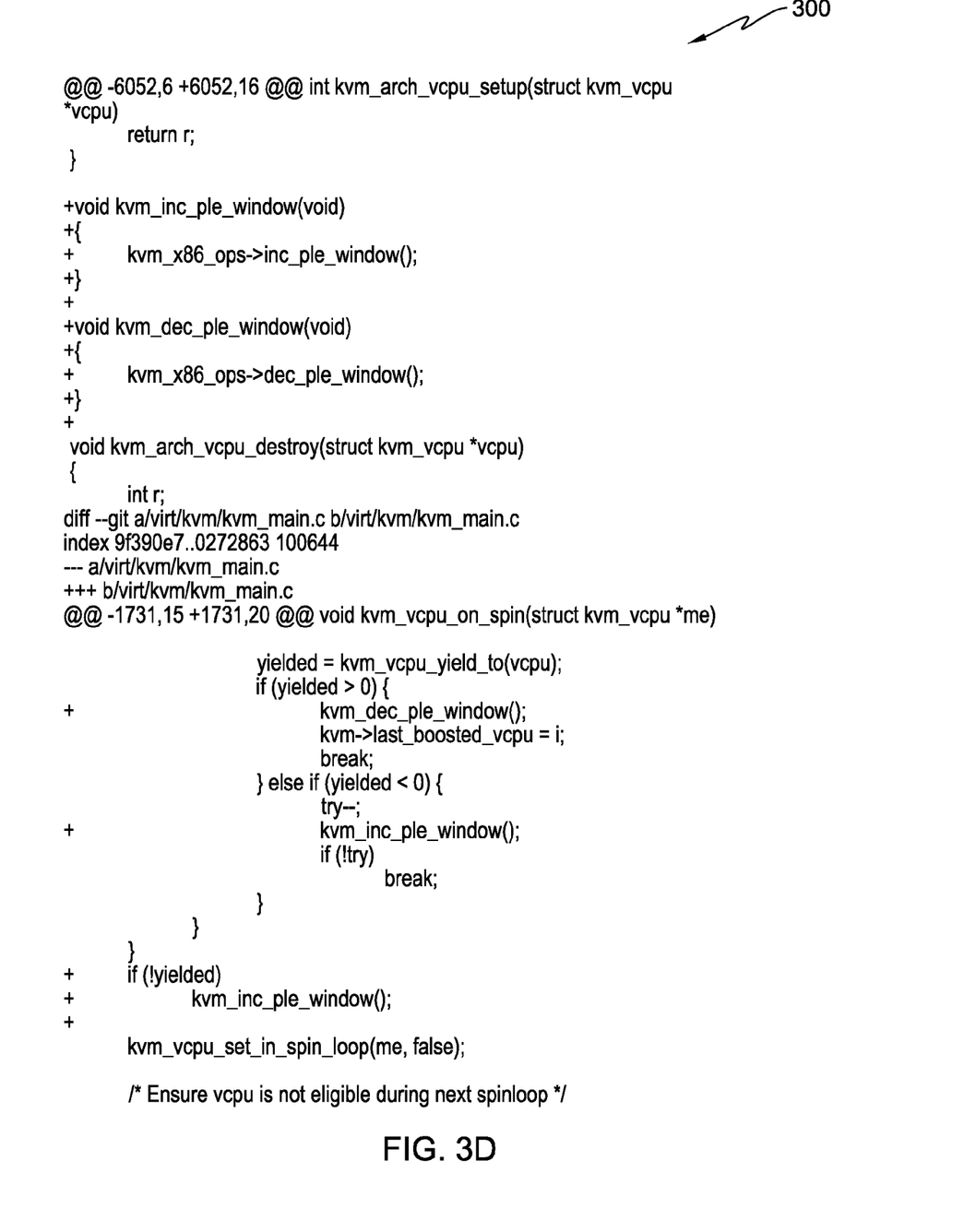

FIG. 2 depicts a flowchart of the steps a method for adjusting Pause-loop exiting (PLE) window values, in accordance with one embodiment of the present invention.

Initially, hypervisor 118 forms logical partitions 104, 106 and 108 from the physical resources of computer 102 through logical sharing of designated processors 120, network cards/capacity 124, and/or memory 126 among logical partitions 104, 106 and 108. Hypervisor 118 also creates data structures, such as fields, indicators, bits, or other data structures within memory 126 or platform registers, to determine how to manage a VM environment.

The data structures created include a pause-loop exiting (PLE) control structure that may be set to cause a VM exit if control logic 140 detects a spin loop being executed by a logical partition. The data structures also include PLE gap value 151 and PLE window value 152. PLE gap value 151 may be used to store a value that represents a number of cycles within which one iteration of a spin loop would typically be executed. PLE window value 152 may be used to store a value that represents a number of cycles that a logical partition is to be allowed to execute a spin loop before a VM exit occurs. For example, the data structures, PLE gap value 151 and PLE window value 152, are set at default values.

Control logic 140 causes processors 120 to execute method embodiments of the present invention, such as the method embodiments described in reference to FIG. 2, for example, by causing processors 120 to include the execution of one or more micro-operations, e.g., to support virtualization, in its response to instructions from hypervisor 118 or logical partitions 104, 106 or 108. For example, the operation of control logic 140 to detect the execution of spin loops may be implemented in microcode executed in response to a pause instruction. Logical partitions 104, 106 or 108 begin executing instructions using the resources allocated by hypervisor 118.

In step 210, a logical partition (e.g., logical partition 104) initiates a pause instruction. A physical processor may also support a "pause" instruction to insert a delay into an instruction stream. A pause instruction may be used in a spin loop, to slow down the execution of the loop to save power and/or to prevent the processor from filling a different load buffer with the same variable each time the loop is executed. A processor may be designed to detect the execution of a pause instruction by a logical partition and to cause the processor to exit that logical partition and enter a different logical partition, based on the assumption that the first logical partition was in a spin loop during which the second logical partition could more efficiently use the processor's resources.

In step 220, control logic 140 determines that logical partition 104 has cycled a number of times exceeding the PLE window value 152. In one embodiment, control logic 140 detects the execution of spin loops. Control logic 140 refers to TSC 142 to receive the count of processor clock cycles subsequent to the initiation of the pause instruction in step 210. Control logic 140 also refers to PLE gap value 151 and PLE window value 152 to determine whether logical partition 104 has cycled a number of times exceeding the value represented by PLE window value 152. The PLE window value represents a number of cycles that a logical partition is to be allowed to execute a spin loop before a VM exit occurs.

In step 230, control logic 140 executes a VM exit. In one embodiment, pause-loop exiting (PLE) control structure causes control logic 140 to execute a VM exit of logical partition 104 in response to control logic 140 detecting a spin loop being executed by logical partition 104 for a number of cycles exceeding PLE window value 152.

In response to an executed VM exit in step 230, PLE handler 150 performs a directed yield (step 240). In one embodiment, PLE handler 150 determines the best virtual CPU of a logical partition to yield the physical resources of processors 120 to and performs a directed yield to that virtual CPU of a logical partition. In the depicted embodiment, the virtual CPU of logical partition 106 or the virtual CPU of logical partition 108 may be candidates for the directed yield. In other embodiments, virtualized computer environment 100 may have any number of other logical partitions with virtual CPU's that may be candidates for the directed yield. PLE handler 150 may use any known method of determining the best virtual CPU of a logical partition (e.g., the virtual CPU of logical partition 108) to yield the physical resources of processors 120 to after the executed VM exit of logical partition 104.

In decision 250, PLE window adjustment function 154 determines whether the directed yield performed in step 240 was successful. In one embodiment, PLE handler 150 sends an indication to PLE window adjustment function 154 indicating whether the directed yield performed in step 240 was successful. Exemplary code from PLE handler 150 (source) is listed below as Exemplary Code (1).

Exemplary Code (1)
{
yielded=0
Iterate over each vcpu V in VM {
yielded=directed_yield_to(V)
if (yielded>0)//success yield
    {decrement ple window
    break out of loop
    }
if (yielded<0)//potential undercommit
    {increment ple window//this is tried for 3 time currently
    }
//Note yielded=0 implies directed yield failure because of some other issue for example target vcpu task is already running
}
if (yielded==0)//we failed to yield to any of the vcpu increment ple window
}

If PLE window adjustment function 154 determines that the directed yield performed in step 240 was successful (decision 250, yes branch), PLE window adjustment function 154 decrements PLE window value 152 (step 255). For example, if a virtual CPU is able to successfully yield to another virtual CPU (e.g., the virtual CPU of logical partition 104 yielding to the virtual CPU of logical partition 108), PLE window value 152 is decremented by a function of PLE_window_delta (e.g., ⅛*PLE_window_delta).

If PLE window adjustment function 154 determines that the directed yield performed in step 240 was unsuccessful (decision 250, no branch), PLE window adjustment function 154 proceeds to decision 257.

In decision 257, PLE window adjustment function 154 determines whether the failure of the directed yield performed in step 240 was due to an undercommit scenario. An undercommit scenario occurs when less virtual CPU's are allocated than there are physical resources on the system. In one embodiment, PLE handler 150 sends to PLE window adjustment function 154 an indication of the reason why the directed yield failed along with the indication that the directed yield performed in step 240 was unsuccessful.

If PLE window adjustment function 154 determines that the failure of the directed yield performed in step 240 was due to an undercommit scenario (decision 257, yes branch), PLE window adjustment function 154 increments PLE window value 152 (step 261). In one example, if a virtual CPU could not yield to another specifically determined virtual CPU in a potential undercommit scenario, PLE window value 152 is incremented by a function of PLE_window_delta (e.g., 1*PLE_window_delta). Potential undercommit scenarios occur when we observe a run queue length of one for both source and target virtual CPUs during a directed yield operation.

If PLE window adjustment function 154 determines that the failure of the directed yield performed in step 240 was not due to an undercommit scenario (decision 257, no branch), PLE window adjustment function 154 proceeds to decision 259.

In decision 259, PLE window adjustment function 154 determines whether there is another virtual CPU to attempt to yield to. In one embodiment, PLE window adjustment function 154 sends an indication to PLE handler 150 requesting that PLE handler 150 attempt to perform a directed yield to another virtual CPU of a logical partition in virtualized computer environment 100. If there are no other virtual CPU's to attempt to yield to in virtualized computer environment 100, PLE handler 150 will send an indication to PLE window adjustment function 154 indicating that PLE handler 150 will not perform a directed yield to another virtual CPU.

If there is another virtual CPU to attempt to yield to in virtualized computer environment 100, PLE handler 150 will send an indication to PLE window adjustment function 154 indicating that PLE handler 150 will perform a directed yield to another virtual CPU. In one embodiment, PLE handler 150 determines the best virtual CPU of a logical partition to yield the physical resources of processors 120 to and performs a directed yield to that virtual CPU of a logical partition. In the depicted embodiment, the directed yield to the virtual CPU of logical partition 108 was attempted in step 240 above. The virtual CPU of logical partition 106 is the only other candidate for the directed yield. In other embodiments, if there are many virtual CPU's, a limit could be set for the number of unsuccessful directed yields that may occur before moving to step 261.

If PLE window adjustment function 154 determines that there is another virtual CPU to attempt to yield to (decision 259, yes branch), PLE window adjustment function 154 waits to perform step 250 again after PLE handler 150 performs another directed yield. This process repeats until there is either a successful directed yield or there are no more virtual CPU's in virtualized computer environment 100 to attempt to yield to.

If PLE window adjustment function 154 determines that there are no other virtual CPU's to attempt to yield to (decision 259, no branch), PLE window adjustment function 154 increments PLE window value 152 (step 261). In another example, if a virtual CPU could not yield to any virtual CPU, PLE window value 152 is incremented by a function of PLE_window_delta (e.g., 1*PLE_window_delta).

FIGS. 3A-3D combined depict example patch logic 300 to adjust PLE window values in accordance with one embodiment of the present invention. Patch logic 300 is an example of one implementation of the steps of the flow chart described in reference to FIG. 2. In this example, this patch adds logic for adjusting PLE window value 152 in PLE handler 150. Upon a successful yield to a virtual CPU, in PLE handler 150, PLE window value 152 is decremented to 4 k. Upon an unsuccessful yield to a virtual CPU, in PLE handler 150, PLE window value 152 is incremented to 16 k. In this patch the default PLE window size is set at 16 k.

Patch logic 300 as depicted is written in patch (unified diff) format that can be applied on top of Linux® kernel code written in C programming language. In other embodiments, other programming languages may be used. The other programming languages may be, for example, object-oriented and/or procedural programming languages.

Figure 4:
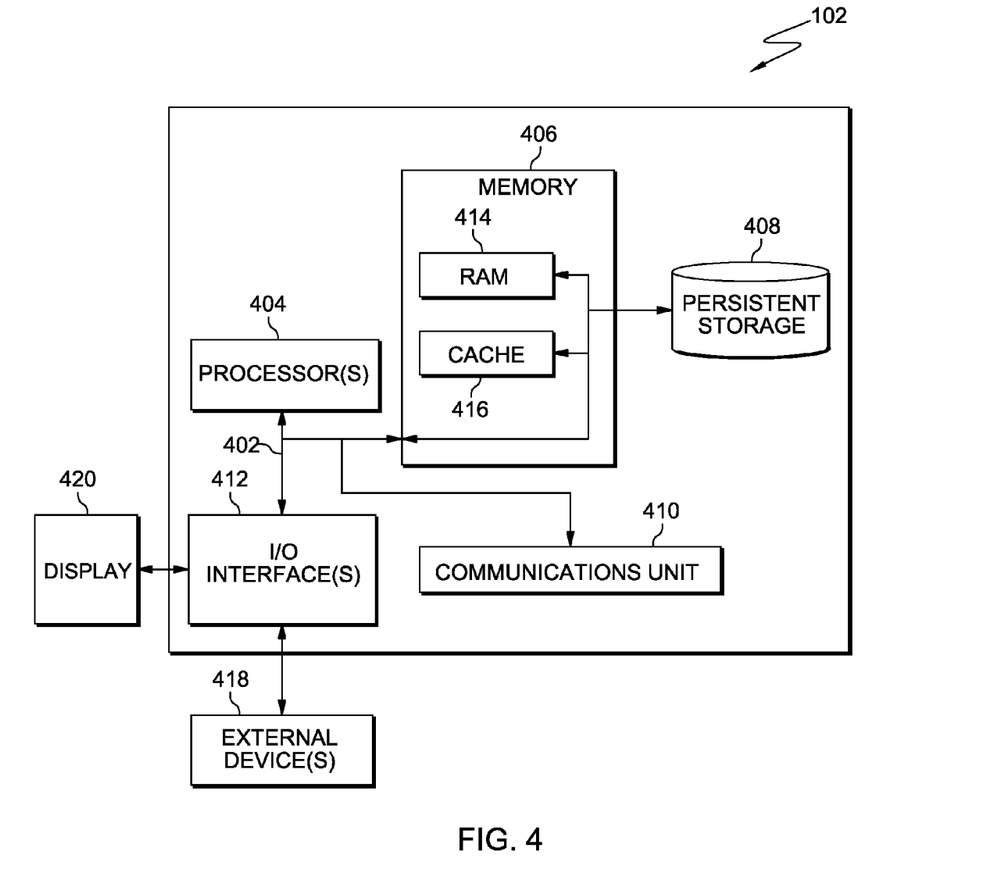
FIG. 4 depicts a block diagram of components of the computer of FIG. 1, in accordance with one embodiment of the present invention.

FIG. 4 depicts a block diagram of components of computer 102 in accordance with one embodiment of the present invention. It should be appreciated that FIG. 4 provides only an illustration of one implementation and does not imply any limitations with regard to the environment in which different embodiments may be implemented. Many modifications to the depicted environment may be made.

Computer 102 is representative of any electronic device capable of executing machine-readable program instructions and hosting a virtualized computer environment.

Computer 102 includes communications fabric 402, which provides communications between processor(s) 404, memory 406, persistent storage 408, communications unit 410, and input/output (I/O) interface(s) 412. Processor(s) 404 include, at least in part, designated processors 120 in FIG. 1 to be shared among logical partitions.

Memory 406 and persistent storage 408 are examples of computer-readable tangible storage devices. A storage device is any piece of hardware that is capable of storing information, such as, data, program code in functional form, and/or other suitable information on a temporary basis and/or permanent basis. Memory 406 may be, for example, one or more random access memories (RAM) 414, cache memory 416, or any other suitable volatile or non-volatile storage device. Memory 406 includes, at least in part, designated memory 126 depicted in FIG. 1 to be shared among logical partitions.

Hypervisor 118, control logic 140, TSC 142, PLE handler 150, PLE gap value 151, PLE window value 152, and PLE window adjustment function 154 may be stored in persistent storage 408 for execution and/or access by one or more of the respective processors 404 via one or more memories of memory 406. Persistent storage 408 includes, at least in part, memory 126 depicted in FIG. 1 to be shared by logical partitions. In the embodiment illustrated in FIG. 4, persistent storage 408 includes flash memory. Alternatively, or in addition to, persistent storage 408 may include a magnetic disk storage device of an internal hard drive, a solid state drive, a semiconductor storage device, read-only memory (ROM), EPROM, or any other computer-readable tangible storage device that is capable of storing program instructions or digital information.

The media used by persistent storage 408 may also be removable. For example, a removable hard drive may be used for persistent storage 408. Other examples include an optical or magnetic disk that is inserted into a drive for transfer onto another storage device that is also a part of persistent storage 408, or other removable storage devices such as a thumb drive or smart card.

Communications unit 410, in these examples, provides for communications with other data processing systems or devices. In these examples, communications unit 410 includes one or more network interface cards. Communications unit 410 may provide communications through the use of either or both physical and wireless communications links. In another embodiment still, computer 102 may be devoid of communications unit 410. Hypervisor 118, control logic 140, TSC 142, PLE handler 150, PLE gap value 151, PLE window value 152, and PLE window adjustment function 154 may be downloaded to persistent storage 408 through communications unit 410. Communications unit 410 includes, at least in part, designated network cards 124 depicted in FIG. 1 to be shared by the logical partitions.

I/O interface(s) 412 allows for input and output of data with other devices that may be connected to computer 102. For example, I/O interface 412 may provide a connection to external devices 418 such as a keyboard, keypad, a touch screen, and/or some other suitable input device. I/O interface(s) may also connect to a display 420. In a preferred embodiment, I/O interfaces are also shared among logical partitions.

Display 420 provides a mechanism to display information to a user.

The aforementioned programs can be written in various programming languages (such as Java or C++) including low-level, high-level, object-oriented or non object-oriented languages. Alternatively, the functions of the aforementioned programs can be implemented in whole or in part by computer circuits and other hardware (not shown).

Based on the foregoing, a method, computer system, and computer program product have been disclosed for adjusting PLE window values in a virtualized computer environment. However, numerous modifications and substitutions can be made without deviating from the scope of the present invention. In this regard, each block in the flowcharts or block diagrams may represent a module, segment, or portion of code, which comprises one or more executable instructions for implementing the specified logical functions(s). It should also be noted that, in some alternative implementations, the functions noted in the block may occur out of the order noted in the figures. Therefore, the present invention has been disclosed by way of example and not limitation.

What is claimed is:

1. A method for adjusting a Pause-loop exiting window value, the method comprising:
   one or more processors executing an exit instruction for a first virtual central processing unit (vCPU) in a virtualized computer environment based on the first vCPU exceeding a first Pause-loop exiting (PLE) window value;
   the one or more processors initiating a first directed yield from the first vCPU to a second vCPU in the virtualized computer environment; and
   the one or more processors determining whether the first directed yield was successfully completed, and in response, performing one of:
      in response to determining that the first directed yield was successfully completed, decrementing the first PLE window value; and
      in response to determining that the first directed yield was not successfully completed because there are less vCPU's allocated than there are physical resources in the virtualized computer environment, incrementing the first PLE window value.

2. A method for adjusting a Pause-loop exiting window value, the method comprising:
   one or more processors executing an exit instruction for a first virtual central processing unit (vCPU) in a virtualized computer environment based on the first vCPU exceeding a first Pause-loop exiting (PLE) window value;
   the one or more processors initiating a first directed yield from the first vCPU to a second vCPU in the virtualized computer environment;
   the one or more processors determining whether the first directed yield was successfully completed; and
   in response to determining that the first directed yield was not successfully completed not because there are less vCPU's allocated than there are physical resources in the virtualized computer environment, incrementing the first PLE window value if there are no other vCPU's in the virtualized computer environment.

* * * * *